(No Model.) 2 Sheets—Sheet 1.
P. M. WILSON & C. M. HAWKINS.
FEATHER PRODUCT.
No. 393,951. Patented Dec. 4, 1888.
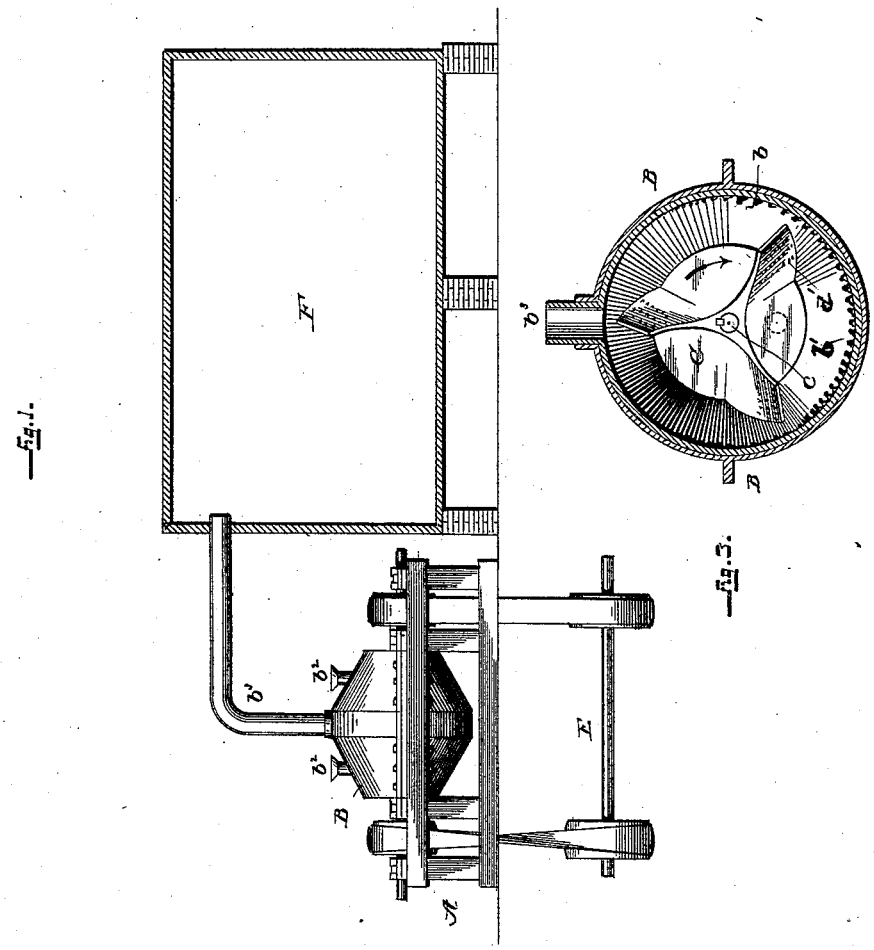
Witnesses:
W. W. Mortimer
R. W. Elliott
Inventor:
Peter M. Wilson
Colin M. Hawkins,
by R. S. Dyrenforth,
their Attorney.

(No Model.) 2 Sheets—Sheet 2.
P. M. WILSON & C. M. HAWKINS.
FEATHER PRODUCT.
No. 393,951. Patented Dec. 4, 1888.
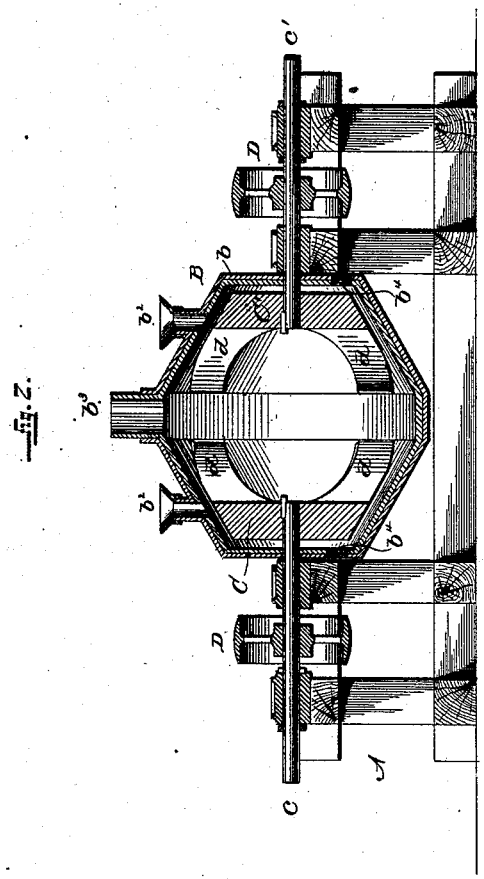
Witnesses:
N. N. Mortimer
R. W. Elliott
Inventor:
Peter M. Wilson and
Colin M. Hawkins,
by R. S. Dyrenforth,
their Attorney.

UNITED STATES PATENT OFFICE.

PETER M. WILSON AND COLIN M. HAWKINS, OF RALEIGH, NORTH CAROLINA.

FEATHER PRODUCT.

SPECIFICATION forming part of Letters Patent No. 393,951, dated December 4, 1888.

Application filed February 21, 1888. Serial No. 264,779. (No model.)

*To all whom it may concern:*

Be it known that we, PETER M. WILSON and COLIN M. HAWKINS, citizens of the United States, residing at Raleigh, in the county of Wake and State of North Carolina, have invented certain new and useful Improvements in Feather Products; and we do hereby declare the following to be a full, clear, and exact description of the invention, such as will enable others skilled in the art to which it appertains to make and use the same.

This invention relates to the treatment of feathers.

The object is to produce a substance from feathers in the nature of down or dowle, utilizing, as far as desirable, the entire substance of the feathers.

To this end the invention consists in a product made from feathers in their crude condition, said product being in the nature of down or dowle, and consisting of a large portion of the substance of the feathers in a peeled or shredded state—that is to say, of portions of the quills as well as the whole of the barbs.

The invention may be carried into effect in many ways; but as an illustration of one way we show a now well-known machine, known as the "cyclone-mill," in which counter-currents of air are produced and the feathers are suspended and mutually abrade each other, or are otherwise shredded, the accompanying drawings illustrating the essential points of such a machine.

In the drawings, Figure 1 is an elevation of the machine combined with a closed chamber, into which the product is taken when the abrasion or attrition has been completed. Fig. 2 is a longitudinal vertical section through the machine, and Fig. 3 is a vertical cross-section of the same on the line $y\,y$ of Fig. 2.

Heretofore material in the nature of down has been produced from feathers by merely cutting, carding, stripping, tearing, or abrading the barbs from the quills; but in all these cases the resulting product, when cleaned for use, has consisted of the barbs of the feather alone, the entire substance of the quill being wasted. A product has also been made by splitting and curling the quills; but this is coarse and harsh.

We find that by subjecting feathers to the action of rapidly-moving counter-currents of air in a closed receptacle, whereby they will be suspended by the currents and suffer mutual attrition or a dashing, not only will the barbs be stripped from the quills and be separated into filaments or flocks, but the quills themselves will be shredded or finely peeled nearly down to the pith into similar filaments or flocks, whereupon when the rough matter remaining, including the pith, is removed nearly the whole of each feather will be converted into a new substance in the nature of down.

Referring to the drawings, A designates a frame-work. Secured firmly in position thereon is a body or casing, B, made, preferably, in the form of two truncated cones joined at their bases and arranged with their axes in a horizontal position. The casing may be made of wrought or cast metal or other suitable material. Where wrought metal—such as boiler-iron—is employed, the interior of the casing may be lined with plates $b$, which may have a number of projections or lugs, $b'$; but where the casing is cast metal the lugs may be cast on the inner faces. At each end the body or casing is provided with feed-openings $b^2$, through which the material to be comminuted is introduced. It is also provided at the center, preferably on the upper side, with a discharge-pipe, $b^3$, through which the comminuted material will be delivered to a closed chamber. It is further provided at each end, and preferably near the lower side, with air-inlets $b^4$. In each end of the body or casing are mounted two revolving heads or beaters, C C'. Each of these heads or beaters is mounted on an independent shaft, $c\,c'$, which extends outward and through the end of the casing, and is supported in bearings on the frame. Each shaft is provided with a driving-pulley, D, and is connected by means of belts with corresponding pulleys on a driving-shaft, E. It is necessary that the heads or beaters should revolve in opposite directions, and for this reason one of the belts is crossed, as shown in Fig. 1. Each of the heads or beaters consists of a hub provided on one side with a series of curved arms or blades, $d$. These arms extend laterally from the hub and outward from the center, and may be provided with lugs or projections $d'$, similar to those on the interior of the casing, which lugs or projections are sets or series of teeth or nipples. The heads are placed at such a distance from each other that a wide space is left between the ends of the arms, and within this space the substance to be comminuted moves.

The mode of operation is as follows: The two heads or beaters being revolved at a high rate of speed and in opposite directions, the material to be comminuted is introduced through the feed-openings $b^2$. The material passes inward to the beaters, and is encountered by the arms or blades $d$, and is propelled thereby and immediately revolves therewith. The centrifugal force developed causes the material to pass outward or toward the inner surface of the casing; but in leaving the blades the material is brought in violent contact with the lugs or projections thereon, and is forced and revolved against the material, leaving the similar opposite head, and the finer portions of the feathers are torn or rubbed away from the quills. As the whole mass is revolving with great rapidity, the portions of the barbs which still remain on the quill are removed therefrom by coming in contact with the projections on the inner surface of the casing, and by coming in contact with a similar substance causing mutual attrition.

Owing to the rapidity with which the beaters revolve, a strong current of air is induced inward through the openings $b^4$ and upward through the central part of the body and out through the discharge-pipe $b^3$. This blast of air carries with it the lighter portions of the feathers which have been removed from the quill into the chamber F. As the beating and friction by counter-currents are continued, the entire feather is reduced to a curled mass resembling down, and which, on account of its resiliency, will be highly valuable in making pillows, quilts, and other bed-covering, &c., the firm substance abraded or peeled from the quill being particularly fine, coiled or curled, and having great springiness and elasticity.

Having thus fully described our invention, what we claim as new, and desire to secure by Letters Patent, is—

A product made from feathers in their ordinary or crude condition, said product being in the nature of down or dowle, and consisting of the greater portion of the substance of the feathers in a shredded state—that is to say, of the barbs and of thin peelings from the quill—substantially as described.

In testimony whereof we affix our signatures in presence of two witnesses.

PETER M. WILSON.
COLIN M. HAWKINS.

Witnesses:
THOS. D. HOGG,
B. S. JERMAN.